Patented Dec. 24, 1940

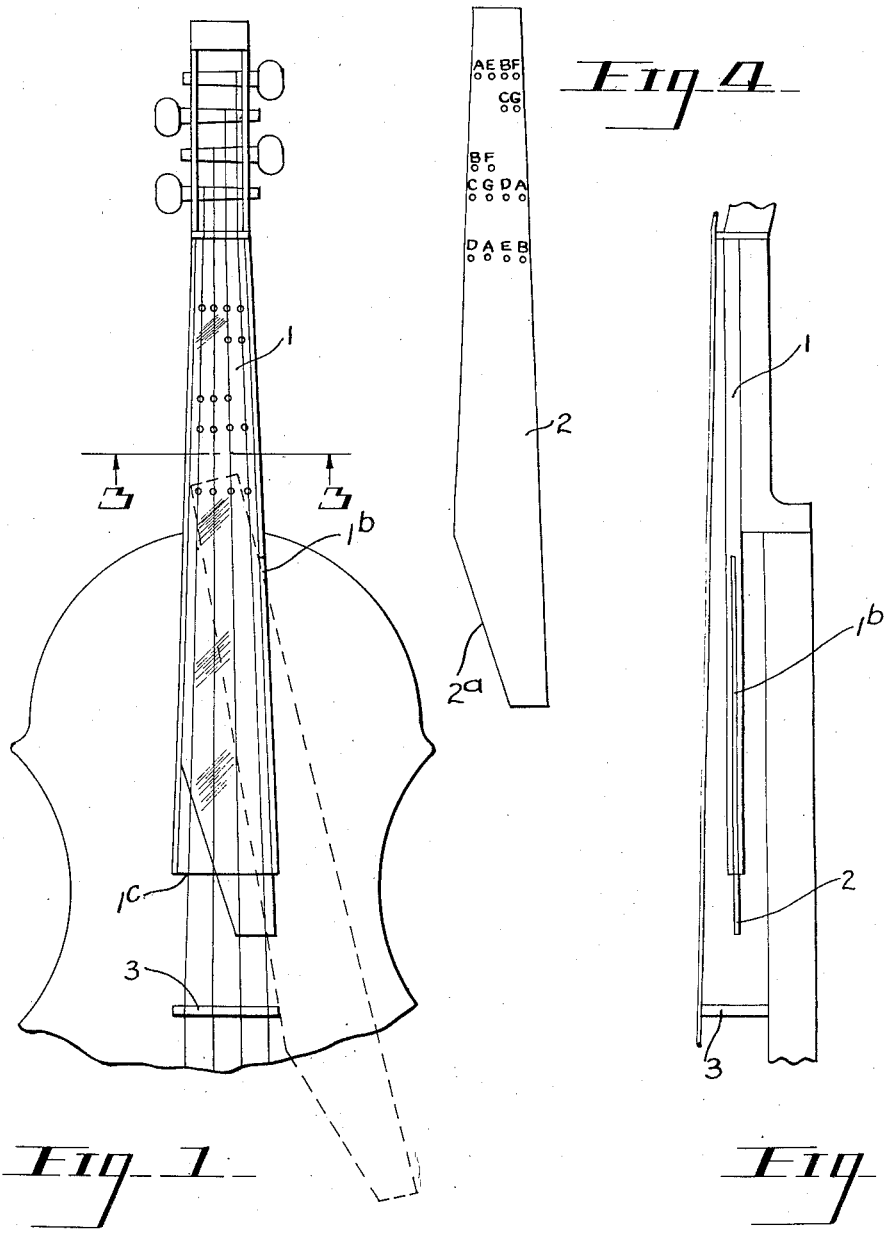

2,225,613

UNITED STATES PATENT OFFICE 2,225,613

FINGER BOARD FOR STRINGED MUSICAL INSTRUMENTS

Frederick J. Alyn, San Diego, Calif.

Application November 16, 1938, Serial No. 240,716

4 Claims. (Cl. 84—314)

My invention relates to improvements in the finger board of stringed musical instruments in which a notation slip is used in connection with the finger board for beginners and students and the objects of my invention are:

First, to provide a hollow transparent finger board which is adapted to receive a notation strip so that the notation strip with various information thereon relative to the playing may be easily placed therein or removed therefrom;

Second, to provide a combination finger board and notation strip which are so arranged and constructed that various changes may be made and the strip may be easily changed to supply the requirements of the advance of the beginners and students;

Third, to provide a device of this class with various strips so that each notation strip need only have a few notations therein for the simple instruction of beginners;

Fourth, to provide a novelly constructed finger board for stringed musical instruments;

Fifth, to povide a novelly constructed notation strip to be used in connection with the novel finger board;

Sixth, to provide a finger board of this class which may be readily applied to stringed musical instruments now in use by simply removing the finger board on the conventional violin and replacing it with this novel finger board;

Seventh, to provide a finger board of this class in which the notation strip may be easily and quickly changed at the will of the student or beginner;

Eighth, to provide a finger board of this class in which the notation strip characters may be magnified by using a magnifying transparent material in the finger board;

Ninth, to provide a finger board of this class in which the frets may be embedded in the finger board of the fretted stringed musical instruments;

Tenth, to provide a finger board for stringed musical instruments of this class which is very simple and economical of construction, easy to apply, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a top or plan view of a violin shown fragmentarily showing my finger board in position thereon and showing by dash line the notation strip partially removed; Fig. 2 is a side elevational view of a fragmentary portion of the violin and showing my fingerboard and notation strip in connection therewith; Fig. 3 is a transverse sectional view taken from the line 3—3 of Fig. 1 shown on an enlarged scale and Fig. 4 is a top or plan view of a notation strip shown alone without the finger board.

Similar characters of reference refer to similar parts and portions throughout the several views of the drawing:

My finger board for stringed musical instruments includes a finger board member 1 made out of transparent material such as synthetic glass, glassine, Celluloid or similar transparent material and it is shaped similar to the conventional finger board for stringed musical instruments except that it is provided with a hollow space 1a substantially its full length which forms a pocket for receiving a notation strip 2, the hollow space being tapered substantially the same as the taper of the finger board from end to end. The side wall is provided with a slot 1b near the wider end to facilitate the insertion of the notation strip 2 as shown best by dash line in Fig. 1 of the drawing, it being noted that it is necessary to insert the notation strip on an angle in the slot 1b to avoid the bridge 3 of the stringed musical instrument and it will also be noted that the notation strip 2 is provided with a bevelled cutoff portion 2a which facilitates the insertion of the strip past the bridge 3 and also in removing said notation strip. This slot 1b is positioned in the side and extending to the end 1c of the finger board. The end 1c is also open its full width to facilitate the insertion of said notation strip. The notation strip 2 is preferably made of a substantially thick semi-rigid tapering strip as shown best in Fig. 4 of the drawing and it is provided with characters and dots thereon which dots are positioned and arranged so that they come immediately under the strings of the musical instrument as shown best in Fig. 1 of the drawing. The notation characters in connection with the various dots indicate the steps in playing for the beginner or student and may be changed to suit from time to time as the student is advanced in the playing and also for playing various music compositions.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a finger board for stringed musical instruments of the class described a wholly transparent finger board member provided with a hollow pocket longitudinally from end to end, said pocket positioned intermediate the front and back sides of the said wholly transparent finger board member, said board provided with a slot extending from the one side and communicating with the hollow portion some distance from the end thereof.

2. In a finger board for stringed musical instruments of the class described a wholly transparent finger board member provided with a hollow pocket longitudinally from end to end, said pocket positioned intermediate the front and back sides of the said wholly transparent finger board member, said board provided with a slot extending from the one side and communicating with the hollow portion some distance from the end thereof, and a notation strip provided with a bevelled portion at one end to facilitate its insertion into said slot past the bridge of the instrument into the hollow portion of said hollow pocket portion of said finger board member.

3. In a finger board for stringed musical instruments of the class described a finger board member provided with a transparent outer surface over its whole upper surface and provided with a notation strip receiving pocket below said wholly transparent outer surface, said finger board member provided with a slot in one side extending from the open end thereof some distance along one side communicating with the notation receiving portion of said finger board member.

4. In a finger board for stringed musical instruments of the class described a finger board member provided with a transparent outer surface over its whole upper surface and provided with a notation strip receiving pocket below said wholly transparent outer surface, said finger board member provided with a slot in one side extending from the open end thereof some distance along one side communicating with the notation receiving portion of said finger board member, the notation receiving pocket portion being curved.

FREDERICK J. ALYN.